(12) United States Patent
Byun et al.

(10) Patent No.: US 6,424,438 B1
(45) Date of Patent: Jul. 23, 2002

(54) APPARATUS AND METHOD FOR REALIZING ALL-OPTICAL NOR LOGIC DEVICE

(75) Inventors: Young Tae Byun, Kyungki; Sang Hyuck Kim, Seoul; Deok Ha Woo, Seoul; Seok Lee, Seoul; Dong Hwan Kim, Seoul; Sun Ho Kim, Koyang, all of (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/714,215

(22) Filed: Nov. 17, 2000

(30) Foreign Application Priority Data

Aug. 29, 2000 (KR) .............................. 00-50420

(51) Int. Cl.$^7$ ................................ G02F 3/00
(52) U.S. Cl. .................. 359/108; 359/107; 359/900
(58) Field of Search .................. 359/108, 107, 359/900; 385/14; 250/227.27

(56) References Cited

U.S. PATENT DOCUMENTS

| | | | | |
|---|---|---|---|---|
| 6,014,235 A | * | 1/2000 | Norte | 372/38.1 |
| 6,122,414 A | * | 9/2000 | Shimizu | 385/2 |
| 6,151,428 A | * | 11/2000 | Vahala et al. | 385/14 |

FOREIGN PATENT DOCUMENTS

| | | | | |
|---|---|---|---|---|
| JP | 0097920 | * | 4/1990 | 359/108 |
| JP | 0190830 | * | 7/1990 | 359/108 |
| JP | 406214280 A | * | 8/1994 | 359/107 |

OTHER PUBLICATIONS

T. Fjelde, et al., "Demonstration of 20 Gbit/s all-optical logic XOR in integrated SOA-based interferometric wavelength converter", Electronics Lett., vol. 36, No. 22, pp. 1863–1864, Oct. 26, 2000.*

A. Sharaiha, et al., "All-optical logic NOR gate using a semiconductor laser amplifier", Electronics Lett., vol. 33, No. 4, pp. 323–325, Feb. 13, 1997.*

R. Schnabel, et al., "Wavelength conversion and switching of high speed data signals using semiconductor laser amplifiers", Electronics Lett., vol. 29, No. 23, pp. 2047–2048, Nov. 11, 1993.*

\* cited by examiner

*Primary Examiner*—Cassandra Spyrou
*Assistant Examiner*—John Juba, Jr.
(74) *Attorney, Agent, or Firm*—Bacon & Thomas

(57) ABSTRACT

An apparatus and method for realizing an all-optical NOR logic device includes a distributed feedback laser diode and a tunable laser diode respectively generating two pump signals of different wavelengths. The apparatus also includes a pulse generator and a Mach-Zehnder modulator modulating the pump signals. The apparatus also includes a delay line adapted to delay a pump signal that has been split from the modulated pump signals and that travels along one optical path, and a polarization controller and an optical attenuator adapted to control another pump signal that has been split from the modulated pump signals and that travels along another optical path, to have the same polarization and intensity as those of the pump signal passing through the delay line. An Er-doped amplifier amplifies the sum of the pump signals so that the amplified pump signal sum saturates a semiconductor optical amplifier. The semiconductor optical amplifier exhibits gain saturation and wavelength conversion characteristics in response to an output signal from the Er-doped fiber amplifier and a probe signal passing therethrough. A plurality of 50:50 fiber couplers are coupled to respective output ends of the laser diodes, the Mach-Zehnder modulator, the attenuator, and the Er-doped fiber amplifier in order to conduct coupling and splitting operations for the pump signals.

7 Claims, 3 Drawing Sheets

APPARATUS AND METHOD FOR REALIZING ALL-OPTICAL NOR LOGIC DEVICE

BACKGROUND OF THE INVENTION

1. Field of the Invention

The present invention relates to an apparatus and method for realizing an all-optical NOR logic device. Specially it relates to an all-optical NOR logic device among all-optical logic devices, in which a signal transmitted from a given point of an optical circuit such as an optical computing circuit is used as a pump signal and a probe signal.

2. Description of the Related Art

Future data communication networks are expected to be used for multimedia services associated with audio signals, still images, and moving images. For this reason, it is expected that the processing capacity of a basic network including a local area network (LAN) and a backbone will be increased up to a range from several hundred Gbit/s to several Tbit/s in future.

As important techniques for transmitting, processing and exchanging data of such a high capacity in a high speed, an optical signal processing technique has been proposed.

In particular, an all-optical logic operation is necessary for optical signal processing systems to avoid a cumbersome electro-optic conversion. All-optical logic devices, which conduct the above mentioned all-optical logic operation, are used for high-speed and parallel processing of data.

Such all-optical logic devices are important in association with next-generation optical computers and all-optical signal processing. For this reason, recently active research and development are being made.

In particular, it is expected that nonlinear effects of semiconductor optical amplifiers will be eventually used to realize all-optical switches or logic devices for optical computers in future.

All-optical logic devices using nonlinear gains of semiconductor optical amplifiers have been implemented using a single-arm ultrafast nonlinear interferometer (N. S. Patel, et al., Opt. Lett., 21, 1446 (1996)) and directly modulated two pump beam switching experiments with the same pump wavelength (T. Houbavlis, et al., IEEE Photon. Technol. Lett., 11, 334 (1999)). However, there has been a limitation in realizing desired logic operations using optical signals of a given wavelength transmitted from the output end of a complex optical circuit.

SUMMARY OF THE INVENTION

Therefore, an object of the invention is to solve the above mentioned problems while generalizing a realization of all-optical logic devices, and to provide an apparatus and method for realizing an all-optical NOR logic device, which is modulating two pump signals using an external modulation scheme, thereby allowing a signal transmitted from a given point of an optical circuit to be used as a pump signal, while being capable of optical signals of two different wavelengths, thereby allowing optical signals of a given wavelength transmitted from a given point of the optical circuit to be used as pump signals.

In accordance with one aspect, the present invention provides an apparatus for realizing an all-optical NOR logic device comprising: pump signal generating means for generating two pump signals of different wavelengths; external modulation means for modulating the generated pump signals; delay/control means including delay means adapted to delay a pump signal, splitted from the modulated pump signals, traveling along an optical path, and control means adapted to control the other pump signal, splitted from the modulated pump signals, traveling along another optical path, to have the same polarization and intensity as those of the pump signal passing through the delay means; amplification means for amplifying the sum of the pump signals respectively outputted from the delay means and the control means so that the amplified pump signal sum saturates a semiconductor optical amplifier; the semiconductor optical amplifier exhibiting gain saturation and wavelength conversion characteristics in response to an output signal from the amplification means, indicative of the amplified pump signal sum, and a probe signal passing therethrough; and coupling/splitting means coupled to respective output ends of the pump signal generating means, the external modulation means, the delay/control means, and the amplification means, and adapted to conduct coupling and splitting operations for pump signals.

In accordance with another aspect, the present invention provides a method for realizing an all-optical NOR logic device wherein two pump signals of different wavelengths pass through a semiconductor optical amplifier, along with a probe signal, in a state in which the pump signals totally have an intensity capable of saturating the semiconductor optical amplifier, to allow the semiconductor optical amplifier to exhibit gain saturation and wavelength conversion characteristics, whereby an all-optical NOR logic operation is realized.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

In accordance with the present invention, an apparatus for realizing an all-optical NOR logic device is provided, which includes pump signal generating means for generating two pump signals of different wavelengths; external modulation means for modulating the generated pump signals, delay/control means including delay means adapted to delay a pump signal, splitted from the modulated pump signals, traveling along an optical path, and control means adapted to control the other pump signal, splitted from the modulated pump signals, traveling along another optical path, to have the same polarization and intensity as those of the pump signal passing through the delay means, and amplification means for amplifying the sum of the pump signals respectively outputted from the delay means and the control means so that the amplified pump signal sum saturates a semiconductor optical amplifier. The semiconductor optical amplifier is configured to exhibit gain saturation and wavelength conversion characteristics in response to an output signal from the amplification means, indicative of the amplified pump signal sum, and a probe signal passing therethrough. The apparatus also includes coupling/splitting means coupled to respective output ends of the pump signal generating means, the external modulation means, the delay/control means, and the amplification means, and adapted to conduct coupling and splitting operations for pump signals.

In accordance with the present invention, four logic signals ((0,0), (0,1), (1,0), and (1,1)) are simultaneously obtained as two pump signals $A(\lambda_{P1})$ and $B(\lambda_{P2})$ of different wavelengths are externally modulated by the external modulation means. When these logic signals pass through the semiconductor optical amplifier, along with one probe signal, the semiconductor optical amplifier exhibits gain saturation and wavelength conversion characteristics. By virtue of the gain saturation and wavelength conversion characteristics of the semiconductor optical amplifier, operation characteristics of an all-optical NOR logic device are obtained.

Figure 1:
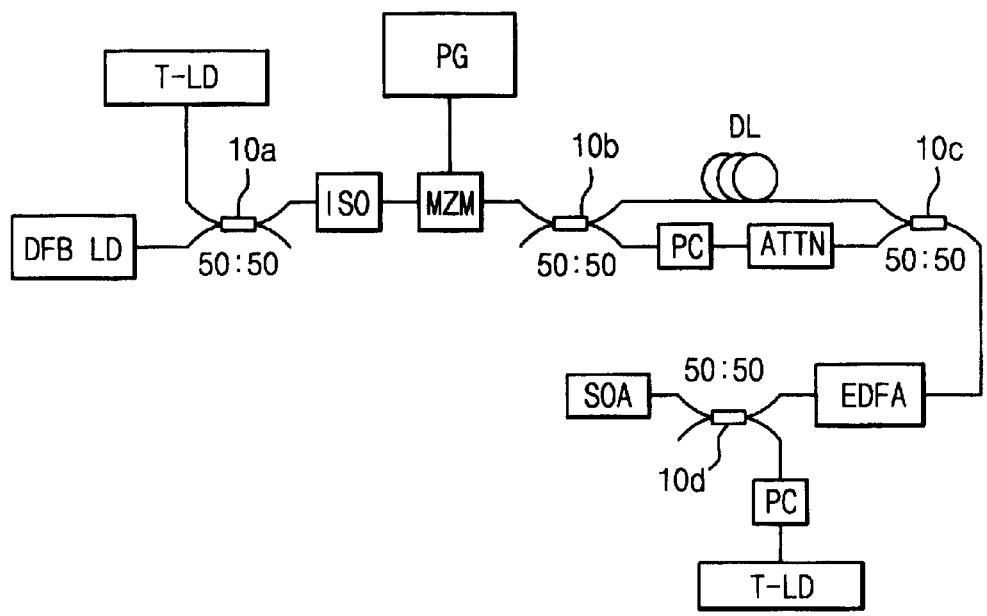
FIG. 1 is a schematic diagram illustrating an apparatus for realizing an all-optical NOR logic device in accordance with an embodiment of the present invention.
Figure 2:
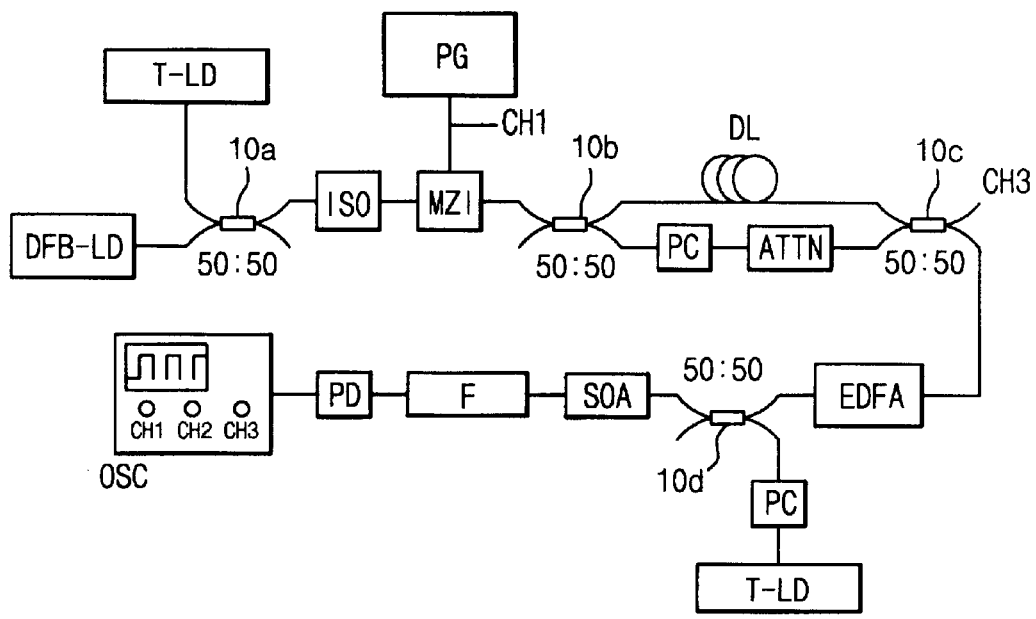
FIG. 2 an experimental system configured by an incorporation of a measuring system in the apparatus of FIG. 1.

FIGS. 1 and 2 illustrate an apparatus for realizing an all-optical NOR logic device in accordance with an embodiment of the present invention, in which pump signals of two different wavelengths modulated using an external modulation scheme and a semiconductor optical amplifier are used, and an experimental and measuring system for the realizing apparatus, respectively.

Referring to FIGS. 1 and 2, a distributed feedback laser diode(DFB-LD) and a tunable laser diode (T-LD) are used as a pump signal generating means. The distributed feedback laser diode(DFB-LD) serves to generate a pump signal $A(\lambda_{P1})$ having a wavelength of 1,554 nm whereas the tunable laser diode (T-LD) serves to generate a pump signal $B(\lambda_{P2})$ having a wavelength of 1,555 nm.

Although the different pump signals ($A(\lambda_{P1})$ and $B(\lambda_{P2})$) exhibit a wavelength difference ($\Delta\lambda$) of 1 nm in the illustrated case, they may have a larger wavelength difference in so far as both wavelengths of those pump signals are within respective gain bandwidth of a semiconductor optical amplifier (SOA) and an Er-doped fiber amplifier (EDFA).

Figure 3:
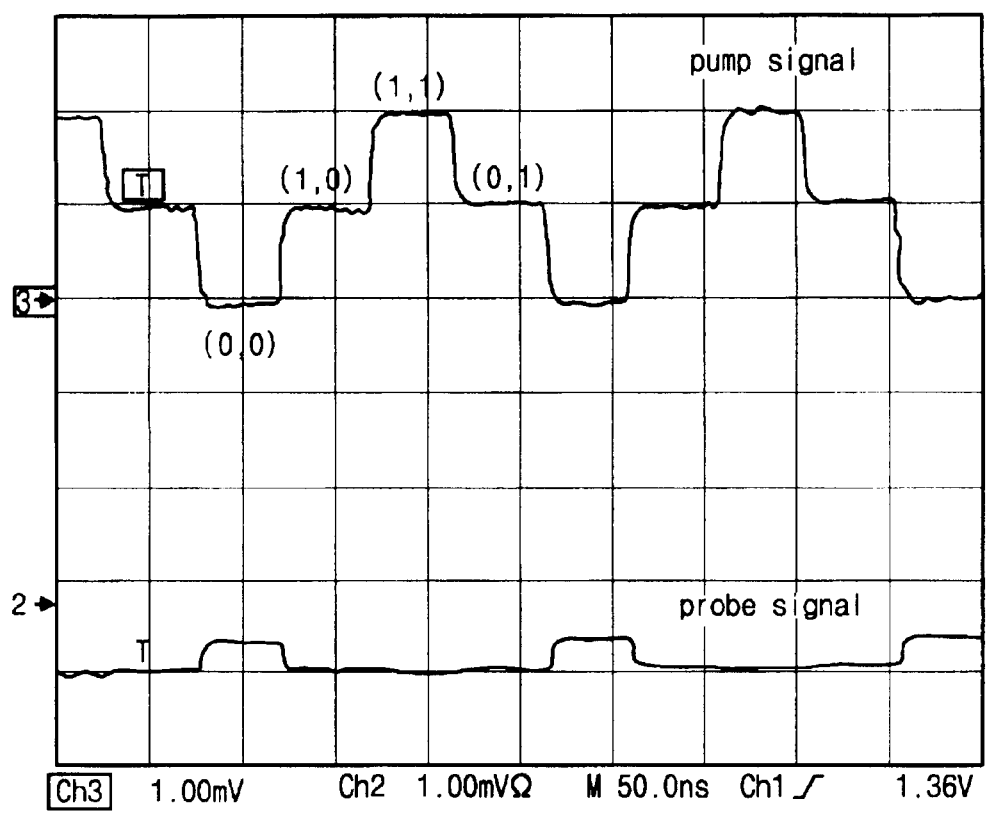
FIG. 3 is a waveform diagram depicting operation characteristics of the apparatus when a Mach-Zehnder modulator shown in FIG. 2 is modulated at 5.2 MHz.

In other words, where the wavelength of a pump signal is within respective gain bandwidths of the semiconductor optical amplifier and Er-doped fiber amplifier, the pump signal has the same waveform shown in FIG. 3.

The driving current for each of the laser diodes (DFB-LD and T-LD) is determined such that two pump signals ($A(\lambda_{P1})$ and $B(\lambda_{P2})$) exhibit an optical intensity of +1.2 dBm at the output end of the first 50:50 fiber coupler (10a).

An external modulation means is coupled to the first 50:50 fiber coupler (10a) in order to modulate the pump signals ($A(\lambda_{P1})$ and $B(\lambda_{P2})$) outputted from the first 50:50 fiber coupler (10a). The external modulation means comprises a pulse generator (PG), which is a square wave generator, and a Mach-Zehnder modulator (MZM).

An isolator (ISO) is coupled to the input end of the Mach-Zehnder modulator (MZM). The isolator (ISO) serves to prevent optical signals reflected from diverse units coupled to the output end of the Mach-Zehnder modulator (MZM) from reaching the laser diodes (DFB-LD and T-LD).

The modulated pump signal outputted from the Mach-Zehnder modulator (MZM) is splitted into two signals while passing through the second 50:50 fiber coupler (10b). One of the resultant pump signals then passes through a delay line (DL), which is a delay means for obtaining a delay of $\lambda/4$, along one optical path. The other pump signal passes through a polarization controller (PC) and an optical attenuator (ATTN), as a control means, along another optical path. Both the pump signals are then inputted to the third fiber coupler (10c) which, in turn, couples the inputted pump signals together. An output power at one optical fiber of the third fiber coupler (10c) is measured at the channel 3 input terminal (CH3) of an oscilloscope (OSC).

The polarization controller (PC) and attenuator (ATTN) serve to conduct a control for allowing the pump signals, emerging from the two optical paths, to have the same polarization and intensity.

The sum of the two pump signals coupled together by the third fiber coupler (10c), "$A(\lambda_{P1})+B(\lambda_{P2})$", exhibits an intensity insufficient to saturate the gain of the semiconductor optical amplifier (SOA). To this end, the coupled pump signals are amplified by an Er-doped fiber amplifier (EDFA) serving as an amplification means, before they are inputted to the semiconductor optical amplifier (SOA).

Meanwhile, another tunable laser diode (T-LD) is coupled to an input end of the semiconductor optical amplifier (SOA) in order to provide a probe signal to be incident to the semiconductor optical amplifier (SOA). The tunable laser diode (T-LD) generates a signal having a wavelength of 1,535 nm. The signal from the tunable laser diode (T-LD) is controlled by another polarization controller (PC), and then coupled to the fourth fiber coupler (10d) so that it is inputted to the semiconductor optical amplifier (SOA), simultaneously with the sum of the two pump signals, $A(\lambda_{P1})+B(\lambda_{P2})$.

Thus, operation characteristics of an all-optical NOR logic device are obtained by virtue of gain saturation and wavelength conversion characteristics of the semiconductor optical amplifier (SOA).

Of the output signals from the semiconductor optical amplifier (SOA), the probe signal passes through an optical filter (F) coupled to the output end of the semiconductor optical amplifier (SOA). On the other hand, the sum of the two pump signals, $A(\lambda_{P1})+B(\lambda_{P2})$, cannot pass through the optical filter (F). Accordingly, only the probe signal is detected by a photodetector (PD) coupled to the output end of the optical filter (F).

The detected signal is measured at the channel 2 input terminal (CH2) of the oscilloscope (OSC). The characteristics of the signal measured by the oscilloscope (OSC) are shown in FIG. 3.

FIG. 3 is a diagram illustrating the operation characteristics of the all-optical NOR logic device when the external modulation means, that is, the Mach-Zehnder modulator (MZM), is modulated at 5.2 MHz. Referring to FIG. 3, it can be found that the pump signal depicted by the upper waveform of FIG. 3, which has a waveform resulting from the sum of two pump signals ($A(\lambda_{P1})$ and $B(\lambda_{P2})$), that is, "$A(\lambda_{P1})+B(\lambda_{P2})$", consists of four logic signals (0,0), (0,1), (1,0), and (1,1).

Referring to FIG. 3, it can also be found that the probe signal depicted by the lower waveform of FIG. 3 shows the all-optical NOR operation of a signal having a wavelength of 1,535 nm by virtue of the tunable laser diode (T-LD). Also, it can be found that the operation characteristics of the all-optical NOR logic device is obtained when respective driving currents of the Er-doped fiber amplifier (EDFA) and semiconductor optical amplifier (SOA) correspond to 150 mA and 170 mA.

That is, the probe signal is detected in response to only the logic signal (0,0). When the logic signal has a value of (0,1), (1,0) or (1,1), no probe signal is outputted because the semiconductor optical amplifier (SOA) is saturated.

When the pump and probe signals are compared to each other in terms of position by referring to FIG. 3, it can be found that the all-optical logic device operates well at a modulation frequency of 5.2 MHz.

Figure 4:
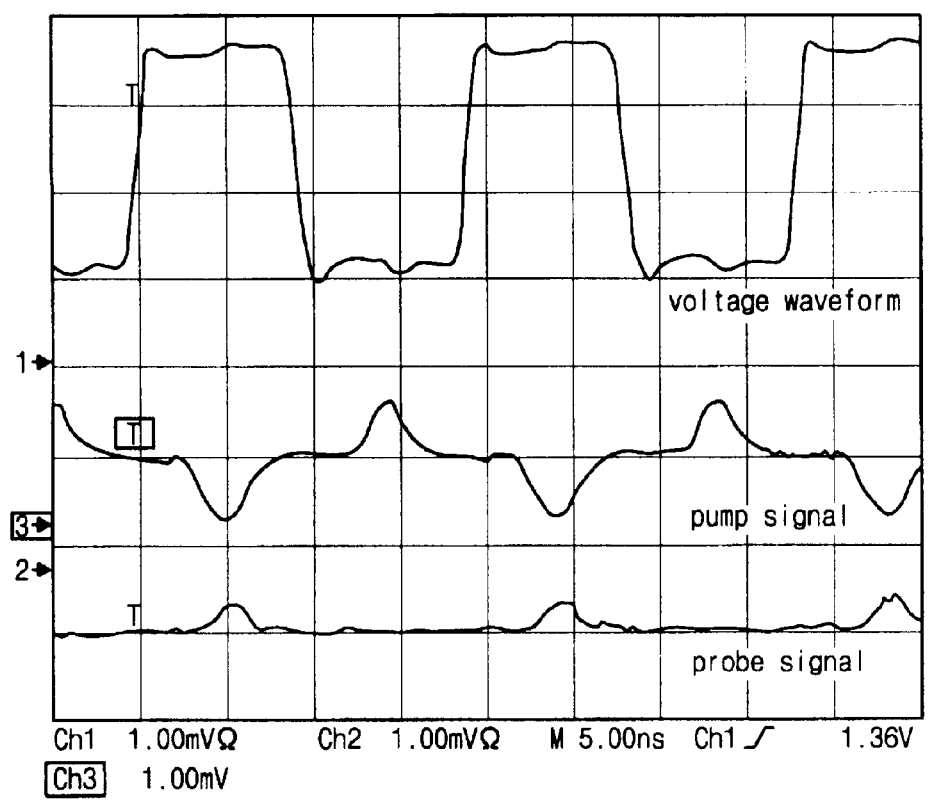
FIG. 4 is a waveform diagram depicting operation characteristics of the apparatus when a Mach-Zehnder modulator shown in FIG. 2 is modulated at 53 MHz.

FIG. 4 illustrates operation characteristics at the frequency of 53 MHz to evaluate the implementation of the all-optical NOR logic device operating at the modulation frequency higher than 5.2 MHz. Referring to FIG. 4, it can be found that the characteristics of the all-optical NOR logic device based on the probe signal is degraded.

As shown in FIG. 4, the square voltage waveform made in the pulse generator (PG) and measured at the channel 1 (CH1) input terminal of the oscillator (OSC) shown in FIG. 2 is considerably distorted from the square waveform. Based on such a voltage waveform, it is impossible to obtain a well-modulated signal at the modulation frequency of 53 MHz. As a result, the four logic signals ((0,0), (0,1), (1,0), and (1,1)) may be distorted, thereby resulting in a degradation in the operation characteristics of the all-optical NOR logic device obtained based on the probe signal.

Therefore, if the pulse generator (PG) forms a stable square voltage waveform at the high frequency, then the all-optical NOR logic device can obtain more accurate operation characteristics at the frequency of several hundred MHz.

As apparent from the above description, in accordance with the present invention, four logic signals ((0,0), (0,1), (1,0), and (1,1)) are obtained as two pump signals (A($\lambda_{P1}$) and B($\lambda_{P2}$)) of different wavelengths are externally modulated by the Mach-Zehnder modulator (MZM). When these logic signals pass through the semiconductor optical amplifier (SOA), along with one probe signal, the semiconductor optical amplifier (SOA) exhibits gain saturation and wavelength conversion characteristics. By virtue of the gain saturation and wavelength conversion characteristics of the semiconductor optical amplifier (SOA), a desired all-optical NOR logic device is successfully realized. Accordingly, it is possible to easily achieve an all-optical logic operation at a given point on a complex optical circuit in an optical computing and optical signal processing system.

Thus, the present invention realizes an all-optical NOR logic device by virtue of gain saturation and wavelength conversion characteristics obtained in a semiconductor optical amplifier when four logic signals produced by externally modulated pump signals of different wavelengths pass through the semiconductor optical amplifier, along with a probe signal.

Accordingly, the present invention can be easily applied to the case in which it is necessary to achieve an all-optical NOR logic operation at a given point on a complex optical circuit in an optical computing and optical signal processing system.

In addition, the technique of the present invention can realize not only all-optical NOR logic devices, but also other all-optical logic devices such as all-optical AND, OR, and XOR logic devices. In particular, where the Mach-Zehnder modulator operating at a high speed is used, it is possible to realize an all-optical logic device operating at the high speed.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for realizing an all-optical NOR logic device comprising:
    pump signal generating means for generating two pump signals of different wavelengths;
    external modulation means for modulating the generated pump signals;
    delay/control means including delay means adapted to delay a pump signal that has been split from the modulated pump signals and that travels along an optical path and control means adapted to control another of the pump signals that has been split from the modulated pump signals and that travels along another optical path, to have a same polarization and intensity as those of the pump signal passing through the delay means;
    amplification means for amplifying a sum of the pump signals respectively outputted from the delay means and the control means so that the amplified pump signal sum saturates a semiconductor optical amplifier;
    the semiconductor optical amplifier exhibiting gain saturation and wavelength conversion characteristics in response to an output signal from the amplification means, indicative of the amplified pump signal sum, and a probe signal passing therethrough, and
    coupling/splitting means coupled to respective output ends of the pump signal generating means, the external modulation means, the delay/control means, and the amplification means, and adapted to conduct coupling and splitting operations for pump signals.

2. The apparatus according to claim 1, wherein the pump signal generating means comprises a distributed feedback laser diode, and a tunable laser diode, and the external modulation means comprises a pulse generator, and a Mach-Zehnder modulator.

3. The apparatus according to claim 1, wherein the control means comprises a polarization controller, and an optical attenuator.

4. The apparatus according to claim 1, wherein the pump signals generated from the pump signal generating means have wavelengths of 1,554 nm and 1,555 nm, respectively, and the probe signal has a wavelength of 1,535 nm.

5. Apparatus according to claim 1, wherein the pump signals generated from the pump signal generating means have a wavelength difference ($\Delta\lambda$) ranged within respective gain bandwidths of an Er-doped fiber amplifier and the semiconductor optical amplifier.

6. A method for realizing an all-optical NOR logic device comprising the steps of:
    generating first and second pump signals of different wavelengths;
    coupling the first and second pump signals;
    externally modulating the coupled first and second pump signals to produce a modulated coupled signal;
    splitting the modulated coupled signal into first and second modulated pump signals;
    delaying the first modulated pump signal;
    causing the first modulated pump signal to travel along a first optical path and the second modulated pump signal to travel along a second optical path different than said first optical path;
    controlling the second modulated pump signal to have a same intensity and polarization as the first modulated pump signal; and
    amplifying a sum of the first and second modulated pump signals with amplification means so that the amplified sum of the modulated pump signals saturates a semiconductor optical amplifier exhibiting saturation and wavelength characteristics in response to an output signal from the amplification means, indicative of the amplified pump signal sum, and a probe signal passing therethrough.

7. The method according to claim 6, wherein the step of modulating the pump signals comprises the step of using a Mach-Zehnder modulator to modulate the generated pump signals.

* * * * *